US007672992B1

(12) United States Patent  
Howarth et al.

(10) Patent No.: US 7,672,992 B1  
(45) Date of Patent: Mar. 2, 2010

(54) SYSTEMS AND METHODS FOR MONITORING A MODEM IN A NETWORKED ENVIRONMENT

(75) Inventors: Mark E. Howarth, South Jordan, UT (US); David A. Jensen, Cedar Hills, UT (US)

(73) Assignee: LANDesk Software, Inc., South Jordan, UT (US)

( * ) Notice: Subject to any disclaimer, the term of this patent is extended or adjusted under 35 U.S.C. 154(b) by 1639 days.

(21) Appl. No.: 10/460,079

(22) Filed: Jun. 12, 2003

(51) Int. Cl.  
*G06F 15/16* (2006.01)

(52) U.S. Cl. .................. 709/203; 709/223; 709/224; 709/227; 709/228; 709/250

(58) Field of Classification Search .............. 709/203, 709/223, 224, 227, 228, 250  
See application file for complete search history.

(56) References Cited

U.S. PATENT DOCUMENTS

| | | | |
|---|---|---|---|
| 4,710,929 A | 12/1987 | Kelly et al. | |
| 4,819,235 A | 4/1989 | Kelly et al. | |
| 5,148,435 A * | 9/1992 | Ray et al. | 714/716 |
| 6,041,327 A * | 3/2000 | Glitho et al. | 707/10 |
| 6,480,531 B1 * | 11/2002 | Malhotra | 375/222 |
| 7,082,598 B1 * | 7/2006 | Le et al. | 717/127 |

* cited by examiner

*Primary Examiner*—Jinsong Hu  
(74) *Attorney, Agent, or Firm*—Austin Rapp & Hardman (57) ABSTRACT

A system for monitoring modem use in a computer system is disclosed. The system includes a computing device and a computer-readable medium that is part of the computing device or in electronic communication with the computing device. The computer-readable medium includes instructions for the system to implement a method for monitoring the system for modem use. The method starts a background application on the system. A communication port is monitored for communication data. It is determined whether the communication data is a modem instruction. If the communication data is a modem instruction, a notification is prepared to be sent to an administrative system. The notification is sent to the administrative system. The notification includes identification information.

19 Claims, 7 Drawing Sheets

SYSTEMS AND METHODS FOR MONITORING A MODEM IN A NETWORKED ENVIRONMENT

TECHNICAL FIELD

The present invention relates generally to computer system administration. More specifically, the present invention relates to systems and methods for monitoring modem use in a networked environment.

BACKGROUND

Computer and communication technologies continue to advance at a rapid pace. Indeed, computer and communication technologies are involved in many aspects of a person's day. For example, many devices being used today have a small computer inside of the device. These small computers come in varying sizes and degrees of sophistication. Computers commonly used include everything from hand-held computing devices to large multi-processor computer systems.

Computers are used in almost all aspects of business, industry and academic endeavors. More and more homes are using computers as well. The pervasiveness of computers has been accelerated by the increased use of computer networks, including the Internet. Most companies have one or more computer networks and also make extensive use of the Internet. The productivity of employees often requires human and computer interaction. Improvements in computers and software have been a force for bringing about great increases in business and industrial productivity.

Maintaining and supporting computer systems is important to anyone who relies on computers. Whether a computer or computing device is in a home or at a business, at least some maintenance and/or support is often needed. For example, sometimes there are problems with computer hardware. In addition, computer hardware is often upgraded and replaced with new components. Similarly computer software is also frequently upgraded or replaced. New computer hardware and software is continually being integrated into systems across the world.

Many businesses have policies for computer use on their computer networks. Some of these policies may relate to privacy issues, security issues, productivity, confidentiality, etc. Computer users may cause problems for the business if their activities are not appropriate and/or approved.

As corporate performance and end-user productivity have become increasingly dependent on computers, computer support personnel are continuously under pressure to ensure the security of the computer network and that computer use policies are being followed. The support personnel are also under pressure to perform tasks as efficiently as possible which may include minimizing effects to existing computer systems and networks or disturbance of computer users.

As shown from the above discussion, there is a need for systems and methods that will improve the ability to manage and support computer systems and to ensure that proper policies are followed by the computer users. Improved systems and methods may enable a person performing computer support to more effectively monitor computer users and the computers on a network. Benefits may be realized by providing increased functionality to assist in computer system administration.

BRIEF DESCRIPTION OF THE DRAWINGS

The present embodiments will become more fully apparent from the following description and appended claims, taken in conjunction with the accompanying drawings. Understanding that these drawings depict only typical embodiments and are, therefore, not to be considered limiting of the invention's scope, the embodiments will be described with additional specificity and detail through use of the accompanying drawings in which:

DETAILED DESCRIPTION

A method for monitoring a computer system for modem use is disclosed. The method starts a background application on the system. A communication port is monitored for communication data. It is determined whether the communication data is a modem instruction. If the communication data is a modem instruction, a notification is prepared to be sent to an administrative system.

In one embodiment, the notification may be sent to the administrative system. The notification may include identification information. The identification information may include a communication identification, an address of the computer system and a user identification.

The background application may be implemented in various ways. For example, the background application may comprise a service and/or a device driver. In one embodiment the device driver may be a filter driver. Moreover, the background application may comprise a daemon. The background application may also use other components, functionality or services including, but not limited to, a Remote Access Service (RAS), a Telephony Application Programming Interface (TAPI), and the like.

Monitoring the communication port for communication data may include analyzing the communication data for writes and/or reads. The monitoring may also include analyzing the communication data for an AT command or analyzing the communication data for a Received Line Signal Detect (RLSD) change.

A computer-readable medium may be used for storing program data. The program data may include executable instructions for implementing a method for monitoring a computer system for modem use. A communication port is monitored for communication data. It is determined whether the communication data is a modem instruction. If the communication data is a modem instruction, a notification is prepared to be sent to an administrative system. The notification is sent to the administrative system. The notification includes identification information.

The executable instructions may comprise a background application. The background application may be embodied in various forms, as disclosed herein and as known by those skilled in the art.

A system for monitoring modem use in a computer system is disclosed. The system includes a computing device and a computer-readable medium that is part of the computing device or in electronic communication with the computing device. The computer-readable medium includes instructions for the system to implement a method for monitoring the system for modem use. The method starts a background application on the system. A communication port is monitored for communication data. It is determined whether the communication data is a modem instruction. If the communication data is a modem instruction, a notification is prepared to be sent to an administrative system. The notification is sent to the administrative system. The notification includes identification information.

It will be readily understood that the components of the embodiments as generally described and illustrated in the Figures herein could be arranged and designed in a wide variety of different configurations. Thus, the following more detailed description of the embodiments of the systems and methods of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

Several aspects of the embodiments described herein will be illustrated as software modules or components stored in a computing device. As used herein, a software module or component may include any type of computer instruction or computer executable code located within a memory device and/or transmitted as electronic signals over a system bus or network. A software module may, for instance, comprise one or more physical or logical blocks of computer instructions, which may be organized as a routine, program, object, component, data structure, etc., that performs one or more tasks or implements particular abstract data types.

In certain embodiments, a particular software module may comprise disparate instructions stored in different locations of a memory device, which together implement the described functionality of the module. Indeed, a module may comprise a single instruction, or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices.

Note that the exemplary embodiment is provided as an exemplar throughout this discussion, however, alternate embodiments may incorporate various aspects without departing from the scope of the present invention.

The order of the steps or actions of the methods described in connection with the embodiments disclosed herein may be changed by those skilled in the art without departing from the scope of the present invention. Thus, any order in the Figures or detailed description is for illustrative purposes only and is not meant to imply a required order unless explicitly stated herein.

Although the embodiments herein are described with reference to multicast jobs, they may be applied to broadcast jobs, point to multipoint, and multipoint to multipoint jobs as well.

Figure 1:
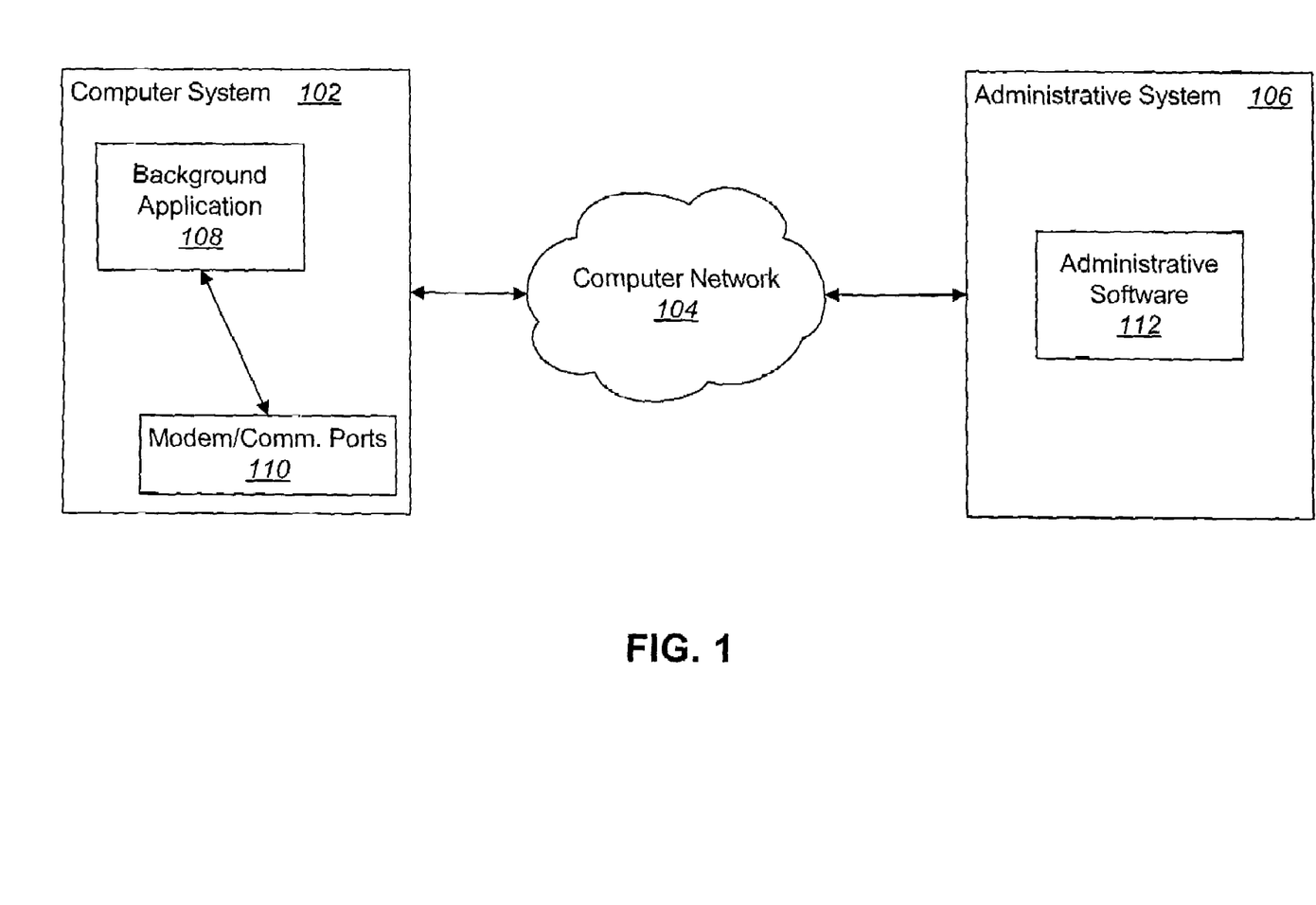
FIG. 1 is a network block diagram of a system for monitoring certain types of communication in a networked environment.

FIG. 1 is a network block diagram of a system for monitoring certain types of communication in a networked environment. A computer system 102 is in electronic communication with a computer network 104. In addition, an administrative system 106 is also in electronic communication with the computer network 104.

In many contexts, administrators of a computer network 104 are responsible for ensuring security and privacy, and for ensuring that any rules or procedures of a company for the computer network 104 are being followed. Administrators may help achieve this by placing a monitor 108 (also known as the background application 108) on a computer system 102 to monitor certain systems and/or events.

Many computers today come with built in modems. In addition, users may bring in modems from outside the work place and connect them to their computer at work. Users may introduce security holes by dialing out or by setting up their system to allow others to dial into the system. As a result, security issues may arise without the network administrator's knowledge.

The monitor 108 may operate to monitor the modem 110 and/or communication port 110 for communications that should be reported to the system administrator. As shown, the monitor 108 may run on the computer system 102 and notify administrative software 112 via the computer network 104 when an event occurs that should be reported.

The computer system 102 has an operating system. The monitor may be implemented for many different kinds of operating systems. Those skilled in the art appreciate the different ways in which the systems and methods disclosed herein may be implemented, depending on which particular operating system is used.

Figure 2:
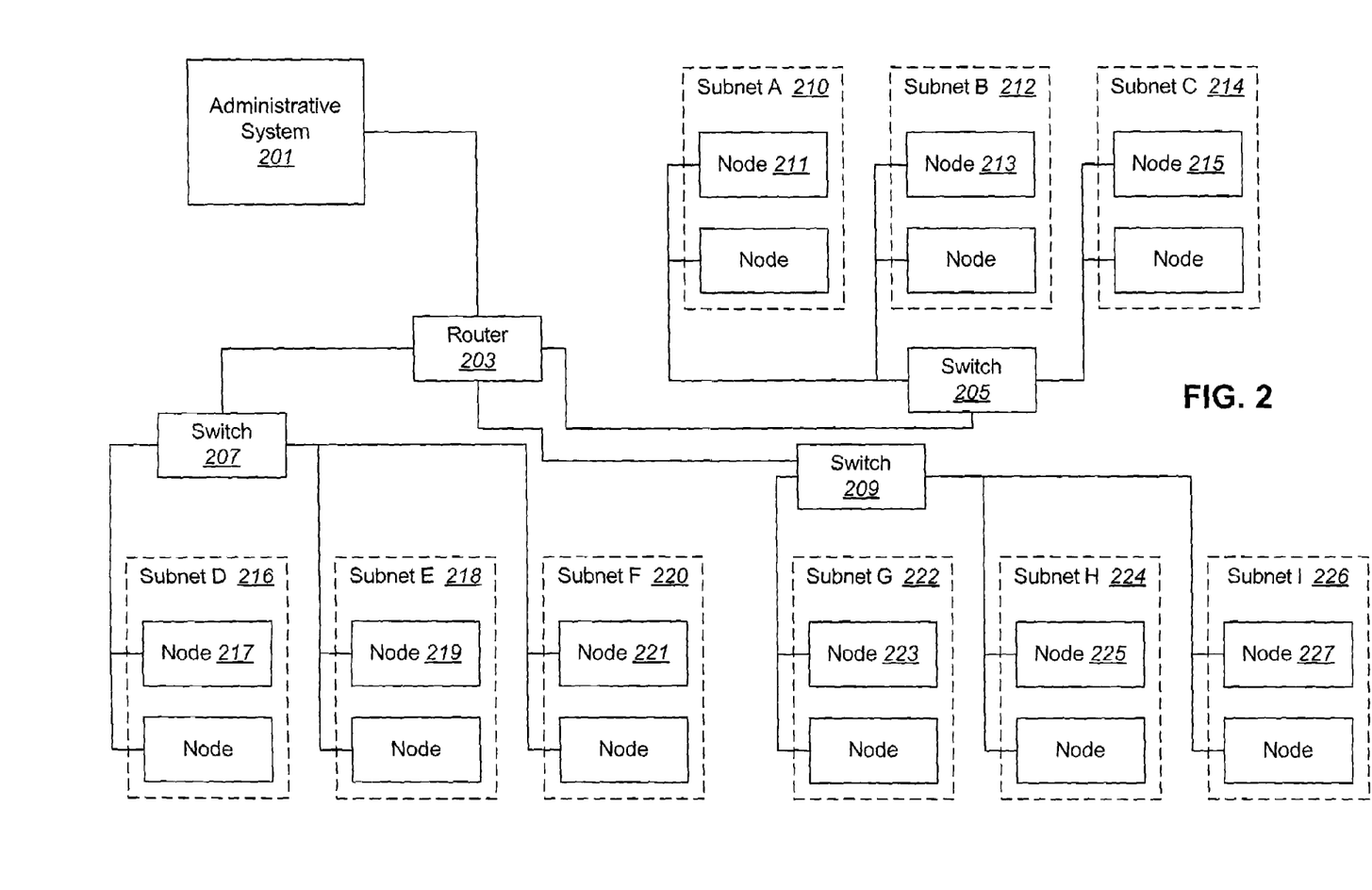
FIG. 2 is an exemplary block diagram illustrating a computer network on which the present systems and methods may be implemented.

FIG. 2 is an exemplary block diagram illustrating a computer network on which the present systems and methods may be implemented. In FIG. 2, an administrative system 201 connects to a router 203. The administrative system 201 may be any computer or computing device that has been configured to, or is being used for, receiving notifications from one or more monitors.

The router 203 may be connected to three switches: a first switch 205, a second switch 207 and a third switch 209. Each switch 205, 207, 209 connects to three subnets. The first switch 205 connects to three subnets 210, 212, and 214. The second switch 207 connects to three subnets 216, 218, and 220. The third switch 209 connects to three subnets 222, 224, and 226. The network nodes or elements 211, 213, 215, 217, 219, 221, 223, 225 and 227 represent computer systems or devices on the computer network. One or more of the nodes may have monitors running on them. When the monitor detects a communication that should be reported, it may send a notification to the administrative system 201.

Figure 3:
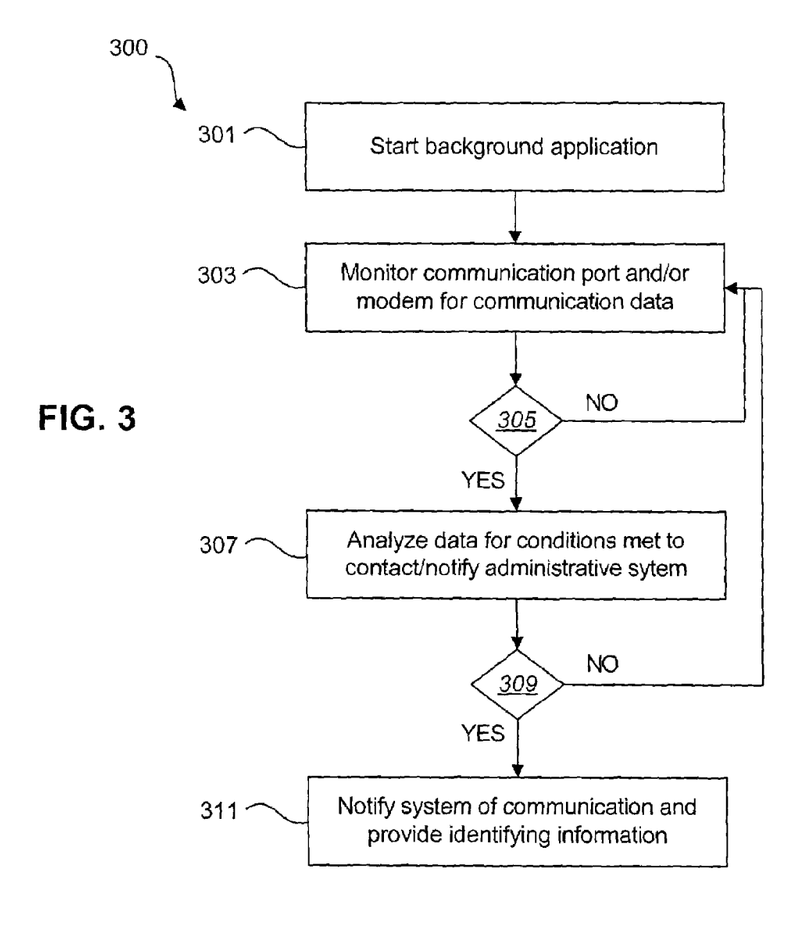
FIG. 3 is a flow diagram of an embodiment of a method for monitoring certain communications.

FIG. 3 is a flow diagram of an embodiment of a method 300 for monitoring certain communications. The monitor may be started 301 and run as a background application. Various examples of background applications will be more fully discussed below. The background application is a computer program that runs in the background, typically while the user is performing other tasks.

The background application 108 monitors 303 one or more communication ports 110 and/or the modem 110. The monitor 108 may be configured to watch for certain types of events or communications. For example, it may be configured to watch for any data being sent/received on one particular comm. port 110. Alternatively, the monitor 108 may be configured to watch more than one comm. port 110. Further, the monitor 108 may be configured to monitor the modem 110 in a different way, for example, through use of the modem driver.

The background application or monitor 108 watches the one or more comm. ports 110 and/or the modem 110 for data that should be reported. If 305 there is no data to monitor, the background application 108 may continue to monitor 303 and watch for any such data. If 305 there is data to monitor, the background application 108 may analyze 307 the data to determine 309 whether any conditions have been met that would require the administrative system 106 to be notified. The conditions that should be met may be very broad (e.g., report any data to the administrative system), or they may be more narrow (e.g., only report particular kinds of data to the administrative system).

If 309 there is no data that should be reported, the background application 108 may continue to monitor 303. If 309 there is data that should be reported, the background application 108 may notify 311 the administrative system 106 and provide any identifying information. If for some reason the notification cannot be sent, the notification or alert may be stored locally until it can be sent.

The notification or alert may be any type of electronic communication. For example, the notification may be an email message, an SNMP trap, a proprietary alert, a broadcast, a packet, a message sent to a pager, a local message box, an audible signal (e.g., a beep), a cellular phone text message, a visual update on a security monitoring program, etc. Those skilled in the art will appreciate the various ways in which a message may be communicated across a computer network.

Figure 4:
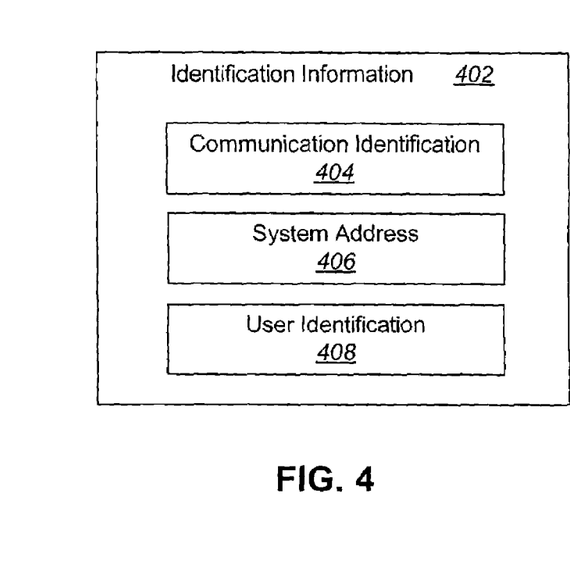
FIG. 4 is a block diagram of an embodiment of identification information that may be sent to the administrative system.

FIG. 4 is a block diagram of an embodiment of identification information 402 that may be sent to the administrative system 106. The identification information 402 may include a communication identification 404 for the communication detected (e.g., a modem command), the address 406 of the computer system where it was detected, the user 408 who was logged in to the system when it occurred, etc.

Figure 5:
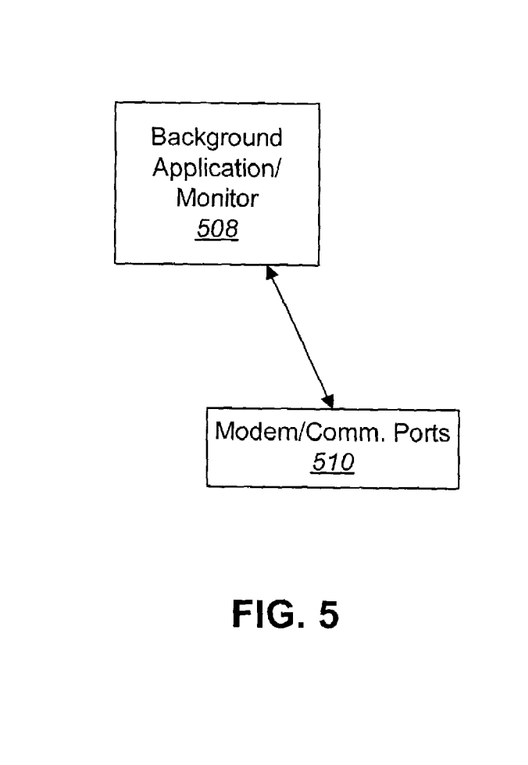
FIG. 5 is a block diagram illustrating the background application monitoring communication ports and/or the modem.

FIG. 5 is a block diagram illustrating the background application 508 monitoring comm. ports 510 and/or the modem 510. The background application 508 is a set of instructions that run in the background, typically while the user is performing other tasks, and perform a task or tasks. Depending on the operating system, background applications may be implemented in various ways.

Figure 6:
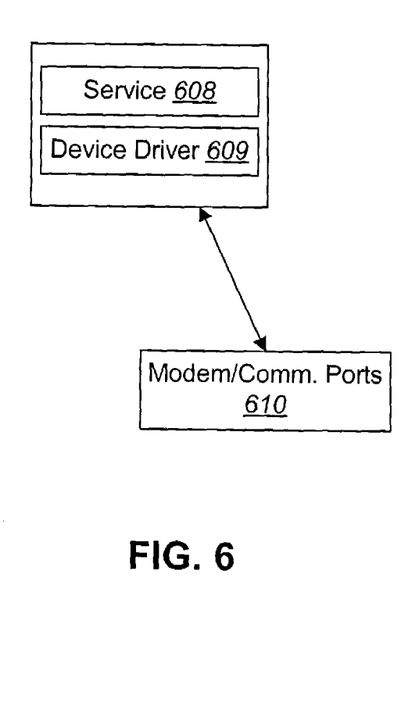
FIG. 6 is a block diagram illustrating an embodiment of the background application monitoring communication ports and/or the modem.

FIG. 6 is a block diagram illustrating an embodiment of the background application monitoring comm. ports and/or the modem. The background application may be implemented through use of a service 608 and a device driver 609. This implementation may be used with a Microsoft Windows operating system. The service 608 may be implemented through an executable program while the device driver 609 may be implemented through a typical device driver (e.g., a .VXD file, a .SYS file).

Windows 9x and Windows NT, the drivers 609 may be configured to look for reads and writes to the communication port 610. On Windows 2000 and XP, the driver 609 may look for reads and writes to the modem driver 610 (which shall be considered as an extension of the modem for purposes of illustration). Each of the reads and writes is sent to the service 608. The service 608 may parse the data. In one embodiment, the service 608 parses the read data looking for the modem result codes for connecting and disconnecting. The write data may be parsed looking for a phone number if it is an ATD command sent to the modem.

The service 608 may also collect system information to include in the identification information 402, such as Ethernet address, IP address and the currently logged in user name.

Figure 7:
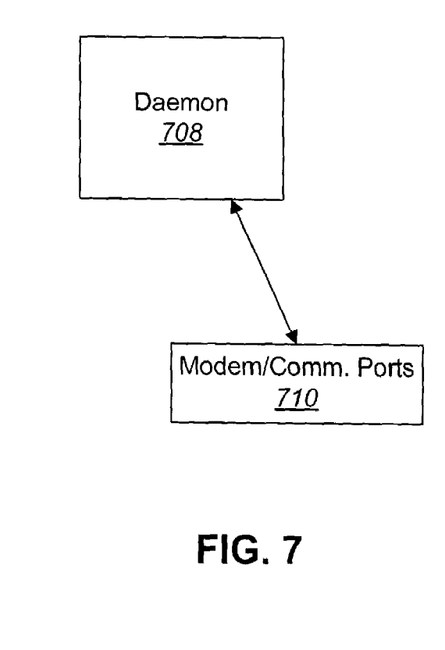
FIG. 7 is a block diagram illustrating another embodiment of the background application monitoring communication ports and/or the modem.

FIG. 7 is a block diagram illustrating another embodiment of the background application 708 monitoring comm. ports and/or the modem 710. The background application may be implemented through use of a daemon 708. This implementation may be used with UNIX, Linux or the like.

Figure 8:
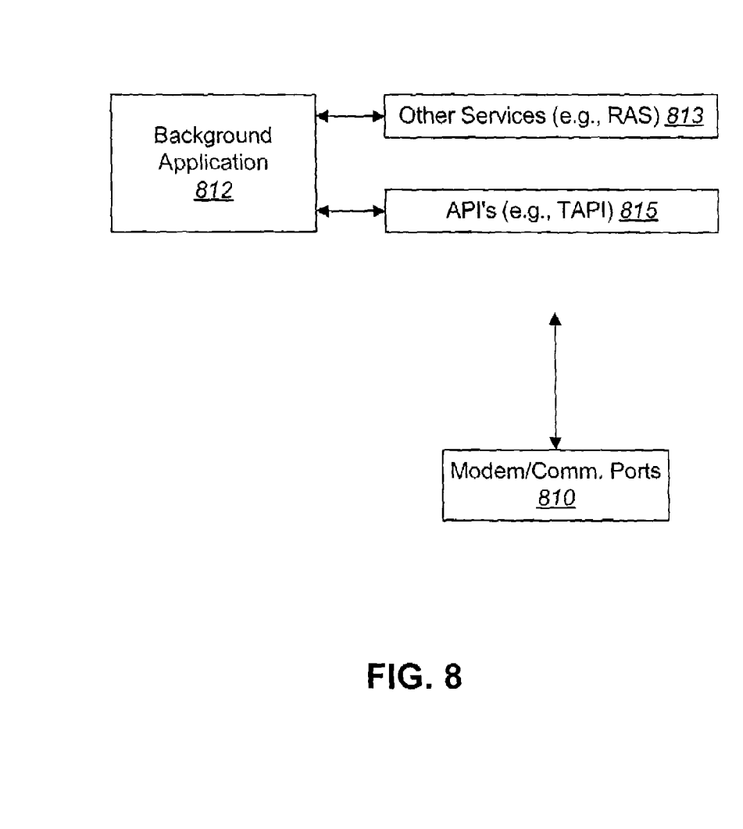
FIG. 8 is a block diagram illustrating other services and calls that may be used in implementing the monitor.

FIG. 8 is a block diagram illustrating that other services 813 and calls may be used in implementing the monitor 812. This embodiment uses nomenclature typical of a Microsoft Windows operating system. The monitor/background application 812 may use other services 813 in accomplishing its tasks. For example, it may retrieve information from using an Application programming interface to Remote Access Service (RAS). RAS is a feature built into some Windows operating systems that enable a user to log into a LAN. RAS works with several major network protocols, including TCP/IP.

The monitor 812 may also use available Application Programming Interfaces 815 (APIs) in accomplishing its tasks. For example, the monitor 812 may use the Telephony Application Programming Interface (TAPI) 815 in monitoring a modem 810.

Figure 9:
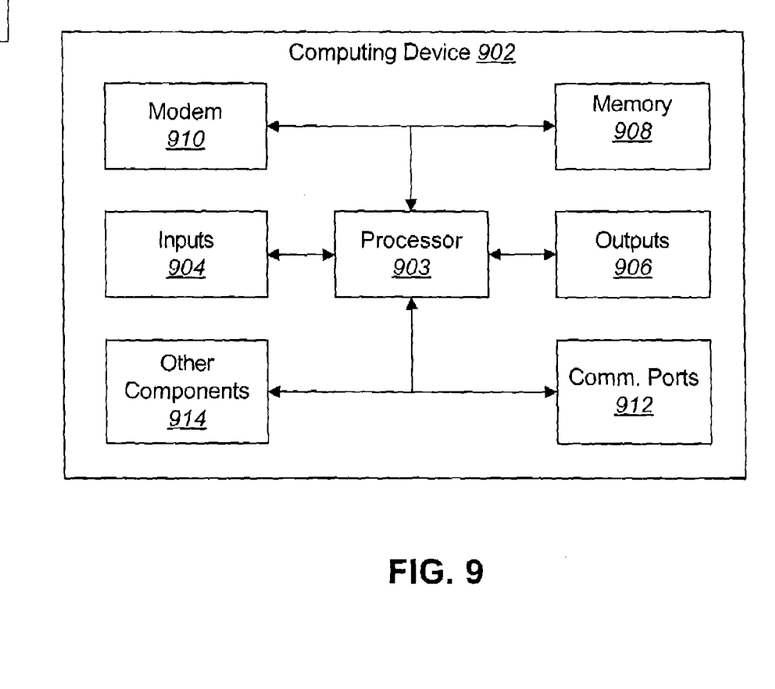
FIG. 9 is a block diagram illustrating the major hardware components typically utilized in a computer or computing device.

FIG. 9 is a block diagram illustrating the major hardware components typically utilized in a computer or computing device used with embodiments herein. Computers and/or computing devices 902 are known in the art and are commercially available. The major hardware components typically utilized in a computing device 902 are illustrated in FIG. 9. A computing device 902 typically includes a processor 903 in electronic communication with input components or devices 904 and/or output components or devices 906. The processor 903 is operably connected to input 904 and/or output devices 906 capable of electronic communication with the processor 903, or, in other words, to devices capable of input and/or output in the form of an electrical signal. Embodiments of devices 902 may include the inputs 904, outputs 906 and the processor 903 within the same physical structure or in separate housings or structures.

The electronic device 902 may also include memory 908. The memory 908 may be a separate component from the processor 903, or it may be on-board memory 908 included in the same part as the processor 903. For example, microcontrollers often include a certain amount of on-board memory. The memory 908 may be embodied in RAM, a hard drive, a CD-ROM drive, a DVD-ROM drive, network storage, etc. The memory 908 is broadly defined as any electronic component capable of storing electronic information.

The processor 903 is also in electronic communication with a modem 910. The modem 910 may be used for communications with other systems, networks, the Internet, etc. The modem 910 may be any kind of modem as known by those skilled in the art.

The computing device 902 may also include other communication ports 912. In addition, other components 914 may also be included in the electronic device 902.

Of course, those skilled in the art will appreciate the many kinds of different devices that may be used with embodiments herein. The computing device 902 may be a one-chip computer, such as a microcontroller, a one-board type of computer, such as a controller, a typical desktop computer, such as an IBM-PC compatible, a Personal Digital Assistant (PDA), a Unix-based workstation, a router, etc. Accordingly, the block diagram of FIG. 9 is only meant to illustrate typical components of a computer or computing device 902 and is not meant to limit the scope of embodiments disclosed herein.

FIG. 9 illustrates a computer system 902 that includes or is in electronic communication with a machine-readable medium (memory) on which is stored a set of instructions according to embodiments herein. Although described in the context of a computer system 902, the embodiments herein may be implemented in any suitable computer system comprising any suitable one or more integrated circuits.

Accordingly, the computer 902 includes or is in communication with a computer-readable medium on which is stored a set of instructions (i.e., software) embodying any one, or all, of the methodologies described above. For example, software can reside, completely or at least partially, within main memory and/or within processors 903. For the purposes of this specification, the term "computer-readable medium" shall be taken to include any mechanism that provides (i.e., stores and/or transmits) information in a form readable by a machine (e.g., a computer). For example, a computer-readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc.

Figure 10A:
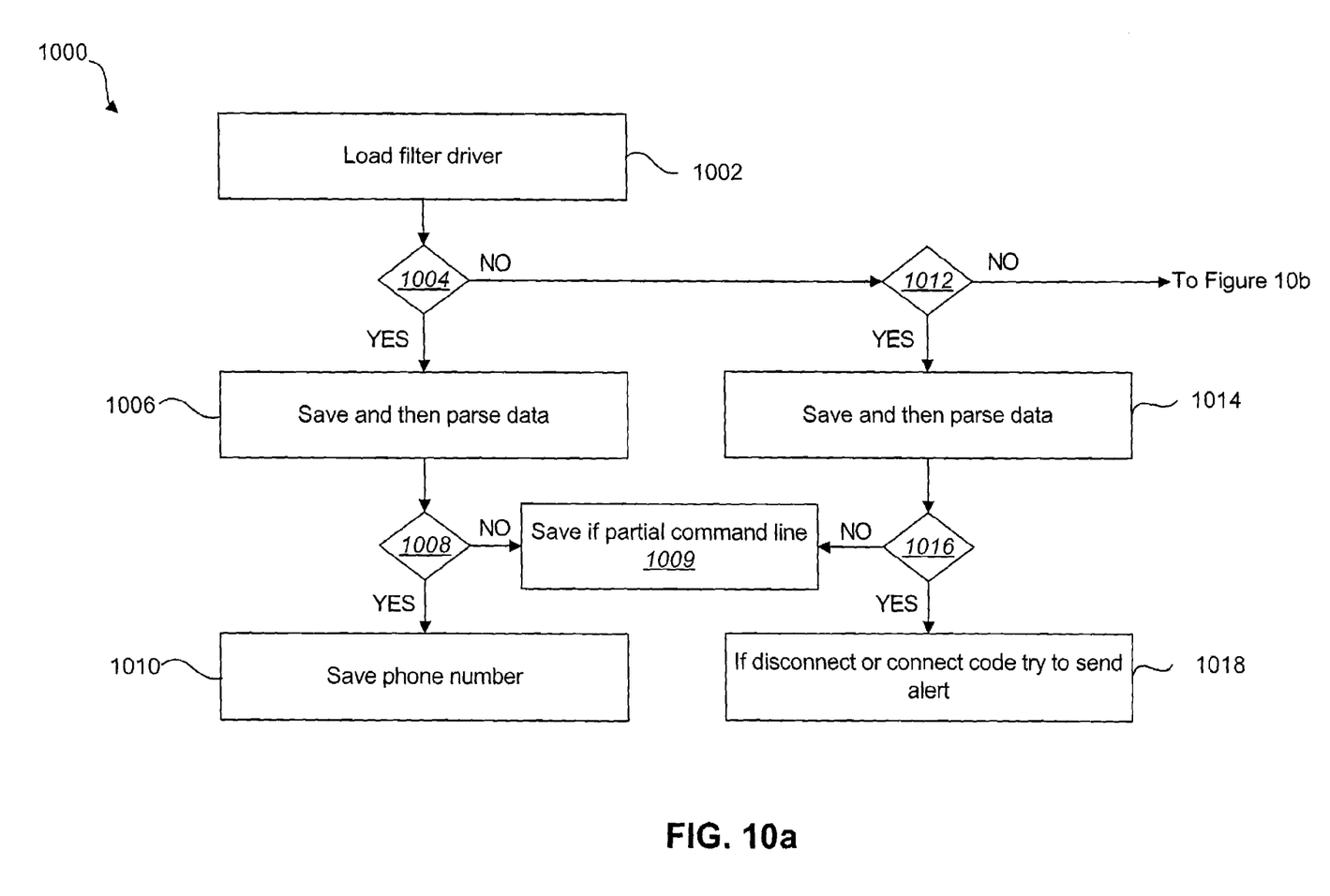
FIGS. 10a and 10b are a flow diagram of an embodiment of a method for monitoring a system for modem communications.
Figure 10B:
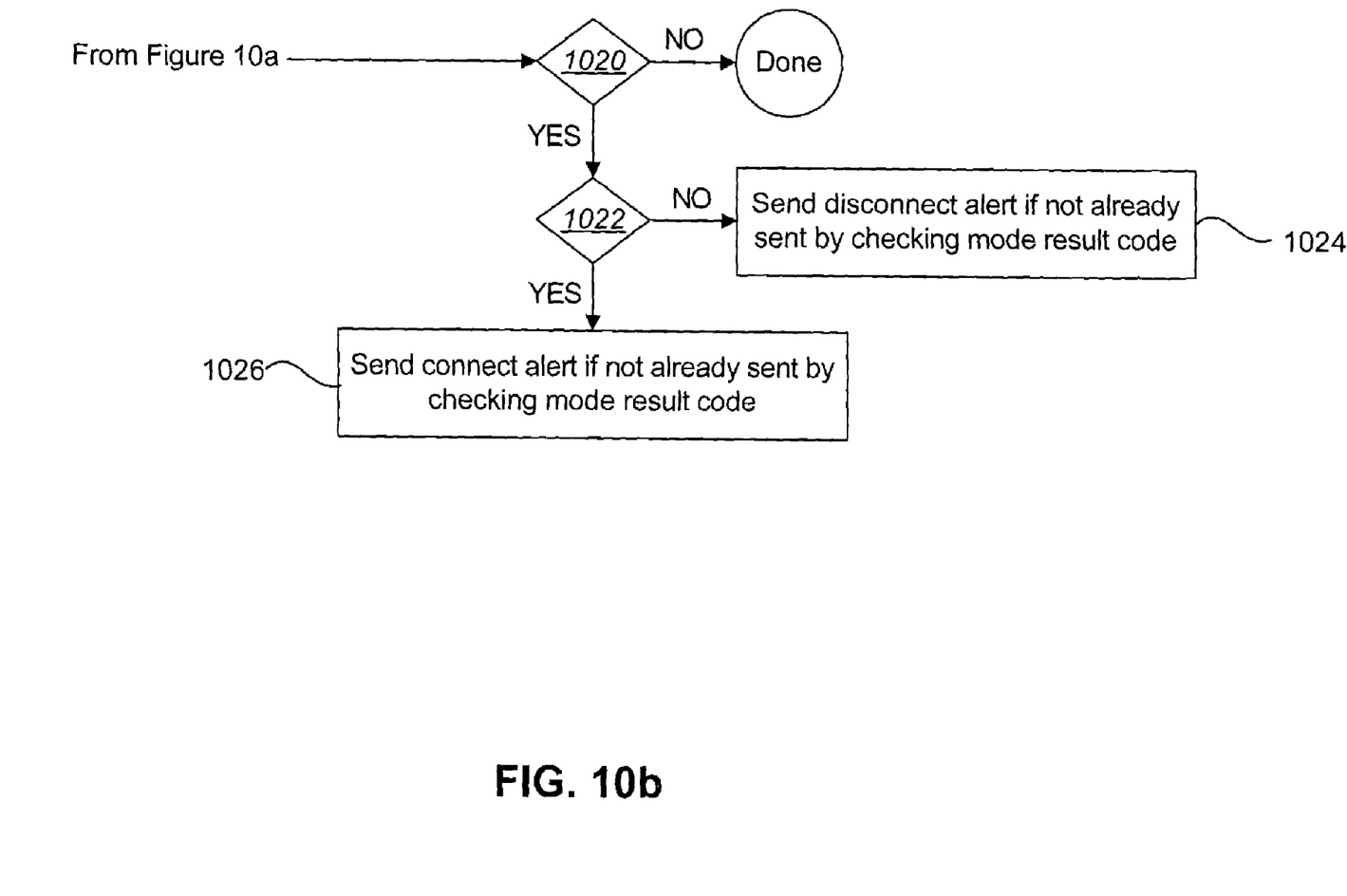

FIGS. 10a and 10b are a flow diagram of an embodiment of a method 1000 for monitoring a system for modem communications. A filter driver may be loaded 1002. The filter driver may be used to monitor reads and writes from/to the comm. port. The driver may determine 1004 if there was a write. If there was a write, the data may be saved and parsed 1006. The data that is saved and parsed may later be sent to the administrative system in a notification or alert. It may then be determined 1008 if it was an ATD command. The "AT" part of the ATD command tells the modem that there is a command to follow. The "D" signifies the dial command. The dial command may contain a telephone number which the monitoring application will save. If it was not an ATD command, the data may be saved 1009 if it were a partial command line. The partial command line happens because the communication port driver may send part of the AT command in a "write". The rest of the command may come in one or more later "writes". As a result, the phone number may be sent over in multiple writes. The monitoring application saves the partial command line so that the actual command can be parsed later. If it was an ATD command, the telephone number may be saved 1010 and later sent as part of the notification or alert.

The driver may determine 1012 if there was a read. If there was a read, the data may be saved and parsed 1014. The data that is saved and parsed may later be sent to the administrative system in a notification or alert. It may then be determined 1016 if it was a valid modem result code. If it was not was a valid modem result code, the data may be saved 1009 if it were a partial command. If it was a valid modem result code, a notification or alert may be sent 1018 if the code was a disconnect or connect code.

The driver may determine 1020 if there was an RLSD (Received Line Signal Detect) change. If there was not a change, the process of further analyzing the RLSD may be complete and the monitor may continue monitoring for reads, writes and RLSD changes. If the RLSD did change, it may then be determined 1022 if the RLSD is high. If RLSD is not high, then a disconnect alert or notification may be sent 1024 if it has not already been sent by checking the mode result code. If RLSD is high, then a connect alert or notification may be sent 1026 if it has not already been sent by checking the mode result code.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A method for monitoring a computer system for modem use, the method comprising:
   starting a background application on a computer system;
   monitoring, via the background application, a communication port on the computer system for communication data;
   determining whether the communication data is a modem instruction; and
   preparing a notification to be sent to an administrative system via a computer network if the communication data is a modem instruction, the notification including identification information relating to the computer system.

2. The method of claim 1, further comprising sending the notification to the administrative system.

3. The method of claim 2, wherein the background application comprises a service.

4. The method of claim 3, wherein the background application further comprises a device driver.

5. The method of claim 4, wherein the device driver is a filter driver.

6. The method of claim 2, wherein the background application comprises a daemon.

7. The method of claim 2, wherein the background application uses a Remote Access Service (RAS).

8. The method of claim 2, wherein the background application uses a Telephony Application Programming Interface (TAPI).

9. The method of claim 2, wherein monitoring the communication port for communication data comprises analyzing the communication data for writes and/or reads.

10. The method of claim 2, wherein monitoring the communication port for communication data comprises analyzing the communication data for an AT command.

11. The method of claim 2, wherein monitoring the communication port for communication data comprises analyzing the communication data for a Received Line Signal Detect (RLSD) change.

12. The method of claim 1, wherein the identification information comprises a communication identification, an address of the computer system and a user identification.

13. A computer-storage media comprising executable instructions for:
   starting a background application on a computer system;
   monitoring, via the background application, a communication port on the computer system for communication data;
   determining whether the communication data is a modem instruction;
   preparing a notification to be sent to an administrative system via a computer network if the communication data is a modem instruction; and
   sending the notification to the administrative system, wherein the notification comprises identification information relating to the computer system.

14. The computer-storage media of claim 13, wherein the identification information comprises a communication identification, an address of the computer system and a user identification.

15. The computer-storage media of claim 13, wherein the executable instructions comprise a background application.

16. The computer-storage media of claim 13, wherein the executable instructions comprise a service and a device driver.

17. The computer-storage media of claim 13, wherein the executable instructions comprise a daemon.

18. A system for monitoring modem use, the system comprising:
   a computing device;
   a computer-storage media that is part of the computing device or in electronic communication with the computing device, the computer-storage media comprising executable instructions, the instructions being executable to:
      start a background application on the system;
      monitor, via the background application, a communication port on the system for communication data;
      determine whether the communication data is a modem instruction;
      prepare a notification to be sent to an administrative system if the communication data is a modem instruction; and
      send the notification to the administrative system, wherein the notification comprises identification information, the identification information relating to the system.

19. The system of claim 18, wherein the identification information comprises a communication identification, and an address of the computer system and a user identification.

* * * * *